(12) United States Patent
Gilad et al.

(10) Patent No.: US 12,229,967 B1
(45) Date of Patent: Feb. 18, 2025

(54) ENHANCED AI IMAGE SEGMENTATION

(71) Applicants: Oran Gilad, Herzliya Pituach (IL); Samuel Chenillo, New York, NY (US); Oren Steinfeld, Tel Aviv (IL)

(72) Inventors: Oran Gilad, Herzliya Pituach (IL); Samuel Chenillo, New York, NY (US); Oren Steinfeld, Tel Aviv (IL)

( * ) Notice: Subject to any disclaimer, the term of this patent is extended or adjusted under 35 U.S.C. 154(b) by 0 days.

(21) Appl. No.: 18/818,601

(22) Filed: Aug. 29, 2024

Related U.S. Application Data

(60) Provisional application No. 63/579,583, filed on Aug. 30, 2023.

(51) Int. Cl.
*G06T 7/194* (2017.01)
*G06V 10/762* (2022.01)

(52) U.S. Cl.
CPC ............ *G06T 7/194* (2017.01); *G06V 10/762* (2022.01); *G06T 2207/20084* (2013.01); *G06V 2201/07* (2022.01)

(58) Field of Classification Search
CPC .......... G06T 7/194; G06T 2207/20084; G06V 10/762; G06V 2201/07
See application file for complete search history.

(56) References Cited

U.S. PATENT DOCUMENTS

| | | | | |
|---|---|---|---|---|
| 6,292,227 B1 | | 9/2001 | Wilf et al. | |
| 11,657,598 B1 * | | 5/2023 | Suresh | G06V 10/26 382/157 |
| 11,828,657 B2 * | | 11/2023 | Ranganathan | G06V 10/762 |
| 2017/0161545 A1 * | | 6/2017 | Champlin | G06V 20/695 |
| 2017/0294000 A1 * | | 10/2017 | Shen | G06F 3/0482 |
| 2018/0276841 A1 * | | 9/2018 | Krishnaswamy | G06V 10/25 |
| 2018/0293734 A1 * | | 10/2018 | Lim | G06N 3/045 |
| 2019/0355128 A1 * | | 11/2019 | Grauman | G06T 7/215 |
| 2020/0066407 A1 * | | 2/2020 | Stumpe | G06T 7/0012 |
| 2021/0142497 A1 * | | 5/2021 | Pugh | G06T 7/194 |
| 2021/0279950 A1 * | | 9/2021 | Phalak | G06T 7/55 |
| 2021/0370993 A1 * | | 12/2021 | Qian | G06T 7/75 |
| 2021/0397916 A1 * | | 12/2021 | Satish | G06K 19/06037 |
| 2022/0138914 A1 * | | 5/2022 | Wang | G06V 10/26 |
| 2022/0262009 A1 * | | 8/2022 | Yu | G06T 7/194 |
| 2022/0361992 A1 * | | 11/2022 | Ezhov | G06T 19/00 |
| 2022/0389511 A1 * | | 12/2022 | Kelley | G06F 18/2414 |
| 2022/0392023 A1 * | | 12/2022 | Wolfe | G06T 5/20 |
| 2023/0146924 A1 * | | 5/2023 | Kumar | G16H 30/40 382/128 |

(Continued)

*Primary Examiner* — Mia M Thomas
(74) *Attorney, Agent, or Firm* — RosserIP, LLC; Roy Rosser

(57) ABSTRACT

Systems and methods for producing high-quality image segmentation masks by efficiently augmenting low-quality segmentation masks initially obtained by lightly trained neural networks are disclosed. Sequences of low-quality segmentation masks are transformed into high-quality segmentation masks by first identifying groups of pixels that are consistently segmented in at least three successive video frames. The pixels surrounding the consistently segmented pixels are then examined and assigned gradient alpha values, i.e., degrees of transparency. In one embodiment the alpha values are made proportional to the RGB distance of the pixel from the mean RGB value of the consistently segmented group of pixels.

10 Claims, 5 Drawing Sheets

(56) References Cited

U.S. PATENT DOCUMENTS

| | | | | |
|---|---|---|---|---|
| 2023/0298272 A1* | 9/2023 | Ezhov | ............... | A61C 9/0053 |
| | | | | 345/423 |
| 2023/0368350 A1* | 11/2023 | Gilad | ............... | G06T 7/70 |
| 2023/0368413 A1* | 11/2023 | Gilad | ............... | G06T 7/80 |
| 2023/0368425 A1* | 11/2023 | Gilad | ............... | G06T 3/02 |

* cited by examiner

ENHANCED AI IMAGE SEGMENTATION

CROSS-REFERENCE TO RELATED APPLICATIONS

This application claims priority to U.S. provisional patent application 63/579,583 entitled "Enhanced AI Image Segmentation" that was filed on Aug. 30, 2023, the contents of which are incorporated by reference in their entirety.

BACKGROUND OF THE INVENTION

This invention relates to video match moving, and more particularly to systems and methods of obtaining image segmentation masks for use in video match moving and most particularly to systems and methods of inexpensively enhancing or augmenting image segmentation methods initially generated by trained neural networks.

DESCRIPTION OF RELATED ART

In video match moving, computer software may be used to artificially insert a virtual graphic into a video stream at the correct location and at the appropriate scale and orientation so that, to a viewer of the video, the graphic appears to be a part of the original video stream. If the event being videoed is, for instance, a live event, players, and objects being used in the event may move past the position at which the virtual graphic is being placed. To avoid the players and event objects being obscured by the virtual graphic and destroying the illusion that the virtual graphic is a part of the original video stream, the portions of the virtual insertion where the player or event object is located must not be shown. This may, for instance, be accomplished by using an occlusion key or image segmentation mask. The image segmentation mask may differentiate between pixels in the image that are foreground pixels and ones that are background pixels. Foreground pixels are those that must be shown instead of the virtual graphic, while the virtual graphic may be shown instead of the background pixels. When the background is relatively simple, it may be possible to use chroma-keying, texture-based, motion-detection based or other computer vision techniques to produce acceptable segmentation masks. But when the background is dynamic such as, for instance, a digital LED screen on the perimeter of a soccer field, those methods typically do not achieve good results. However, AI models may accurately segment those foreground objects, and, if fully trained, achieve better foreground-background classification and produce better segmentation masks.

Such image segmentation masks may, for instance, be obtained using trained neural networks such as, but not limited to, an AI CNN (convolutional neural network).

Such a neural network may, for instance, be trained to recognize foreground objects in a first sequence of video frames that may be representative of video sequences to be used for insertion of virtual graphics using match moving techniques. However, the performance of a segmentation mask obtained using such neural networks (NN) may be limited by the amount of training of the NN. Obtaining high quality, pixel accurate segmentation masks using NNs may, for instance, necessitate sourcing and annotating hundreds of thousands of images for those foreground objects. Training the NN may then require running hundreds of thousands of epochs, that is, rounds of processing all of the images. This may need significant amounts of time on powerful computers. Perfecting the segmentation masks obtained by NNs may, therefore, be tremendously expensive and time consuming.

What is needed are systems and methods of enhancing the performance of lightly trained neural networks that may be accomplished in a manner that is both cost and time effective.

Relevant prior art includes:

U.S. Pat. No. 6,292,227 issued to Wilf et al. on 2001 Sep. 18 entitled "Method and Apparatus for Automatic Electronic Replacement Of Billboards In A Video Image" that describes an apparatus for automatic replacement of a billboard in a video image is provided. The billboard comprises a chroma-key surface, and the apparatus includes a video camera for viewing the billboard, and a chroma-key unit operative to detect at least one chroma-key color of the billboard chroma-key surface. A reference color of the chroma-key unit is adjustable to conform to the color of the chroma-key surface, thereby enabling the chroma-key unit to correctly identify the billboard surface and to correctly replace the chroma-key surface of the billboard by a virtual advertisement in a video image with correct occlusion of any foreground object.

US 2019/0355128 published by Grauman; Kristen on 2019 Nov. 21 entitled "Segmenting Generic Foreground Objects in Images And Videos" that describes a method, system and computer program product for segmenting generic foreground objects in images and videos. For segmenting generic foreground objects in videos, an appearance stream of an image in a video frame is processed using a first deep neural network. Furthermore, a motion stream of an optical flow image in the video frame is processed using a second deep neural network. The appearance and motion streams are then joined to combine complementary appearance and motion information to perform segmentation of generic objects in the video frame. Generic foreground objects are segmented in images by training a convolutional deep neural network to estimate a likelihood that a pixel in an image belongs to a foreground object. After receiving the image, the likelihood that the pixel in the image is part of the foreground object as opposed to background is then determined using the trained convolutional deep neural network.

Various implementations are known in the art, but fail to address all of the problems solved by the invention described herein. Various embodiments of this invention are illustrated in the accompanying drawings and will be described in more detail below.

SUMMARY OF THE INVENTION

Inventive systems and methods for producing high quality image segmentation masks are disclosed. In particular, systems and methods of efficiently augmenting low-quality segmentation masks initially obtained by lightly trained neural networks are disclosed.

In a preferred embodiment, a neural network may be lightly trained to recognize foreground objects in a first sequence of video frames that may be representative of video sequences to be used for insertion of virtual graphics using match moving techniques. The lightly trained neural network may then be used to segment a second sequence of video frames to produce a sequence of low-quality segmentation masks.

However, the performance of the low-quality segmentation masks obtained by the lightly trained neural network may be inadequate for many applications such as, but not limited to, broadcast television. To avoid the expense of extensively training the neural network, the low-quality segmentation masks obtained by the lightly trained neural network may instead be significantly improved by effective augmentation. This augmentation may, for instance, be accomplished by obtaining one or more groups of consistently segmented pixels from a sequence of segmentation masks. The low-quality segmentation masks may then be augmented by assigning a gradient alpha value to pixels neighboring the consistently segmented groups of pixels. These augmented segmentation masks may then become high-quality segmentation masks that may be used to effectively and accurately combine the second sequence of video frames with a sequence of video overlays.

In a preferred embodiment, the gradient alpha values assigned to the neighboring pixels may be proportional to an RGB distance of the pixels from a mean RGB value of the consistently segmented pixels.

In a further refinement of the augmentation process, groups of consistently segmented pixels may be obtained by first clustering the segmented pixels on each of the segmented masks into groups. Groups of clustered pixels on adjacent segmented masks may then be compared, and groups that form a chain over a number of segmented masks may then be selected as being consistently segmented groups of pixels. This comparison of clustered pixels on adjacent segmentation masks may, for instance, be accomplished by correlating templates of each group of segmented pixels in a first segmentation mask with groups of segmented pixels in a second, adjacent segmentation mask. Groups of segmented pixels in which the correlations are higher than a predetermined high threshold in at least three successive segmented masks may then be selected as being groups of consistently segmented pixels. Pixels in a neighborhood of the consistently segmented groups of pixels may then be checked or examined, and unsegmented pixels in the neighborhood may be assigned a gradient alpha value. These gradient alpha values may be proportional to an RGB distance of the pixel from a mean RGB value of the consistently segmented pixels.

In a further refinement, groups of segmented pixels in which the correlations are lower than a predetermined low threshold in at least three successive segmented masks may be selected as a second set of consistently segmented groups of pixels. Each pixel in this second set of consistently segmented groups may then be accorded a gradient alpha value that may be proportional to a distance of the group correlation from the low threshold.

Therefore, the present invention succeeds in conferring the following, and others not mentioned, desirable and useful benefits and objectives.

It is an object of the present invention to efficiently and cost effectively improve the performance of segmentation masks obtained by lightly trained neural networks.

DETAILED DESCRIPTION OF THE INVENTION

Figure 1A:
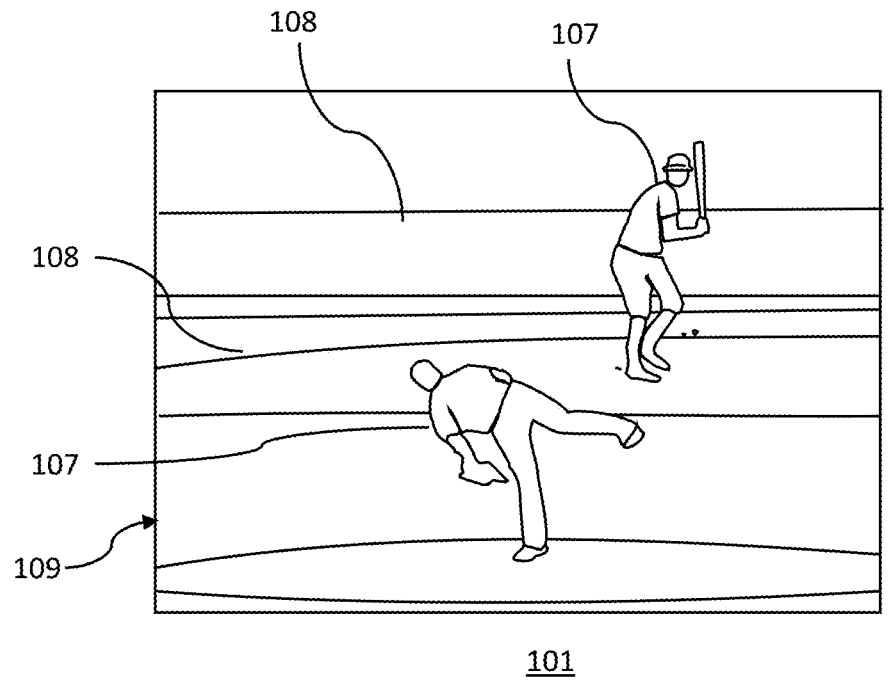
FIG. 1A shows a schematic representation of a video frame.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1A shows a schematic representation 101 of a video frame.

The video frame 109 may, for instance, be part of a video recording or broadcast of a game, such as, but not limited to, baseball, being played at a venue or stadium. The image shown in FIG. 1A may, for instance, be part of a first sequence of video frames.

The video frame may contain foreground objects 107 that may, for instance, be players participating in the event, and/or objects such as, but not limited to, balls and bats being used to play the game. The video frame may also contain background objects 108 such as, but not limited to, the field or pitch that the game is being played on, or portions of the venue in which the game is being played. Other background objects may include a crowd watching the game and graphics such as, but not limited to, in-stadium signage.

Figure 1B:
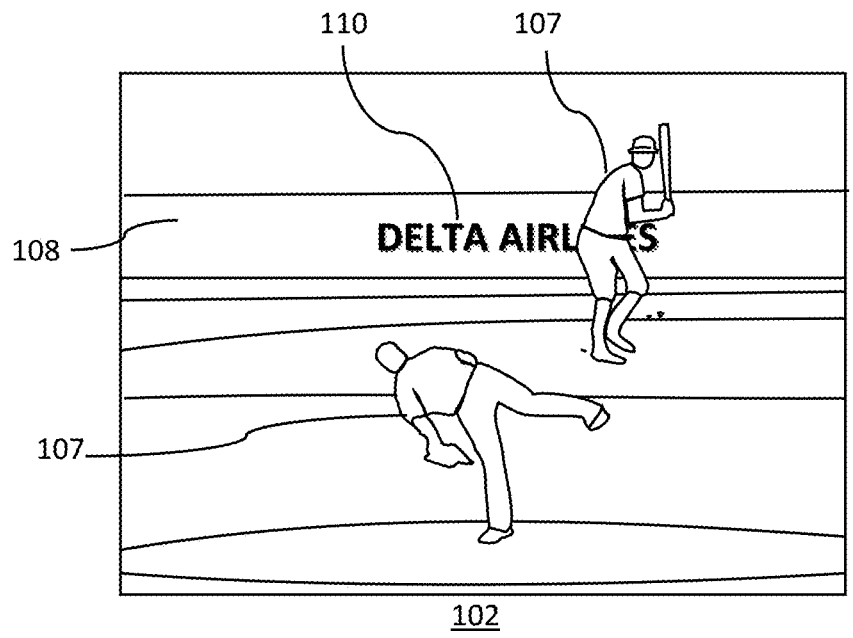
FIG. 1B shows schematic representation of a video frame having a video overlay.

FIG. 1B shows schematic representation of a video frame 102 having a video overlay 110.

An objective of using match-moving techniques may be to have the video overlays 110 appear as they are part of the venue. In order to do that, the video overlays 110 are preferably combined with the main video sequence such that they appear in front of background objects 108 but behind foreground objects 107. This may, for instance, be accomplished using segmentation masks.

Figure 2:
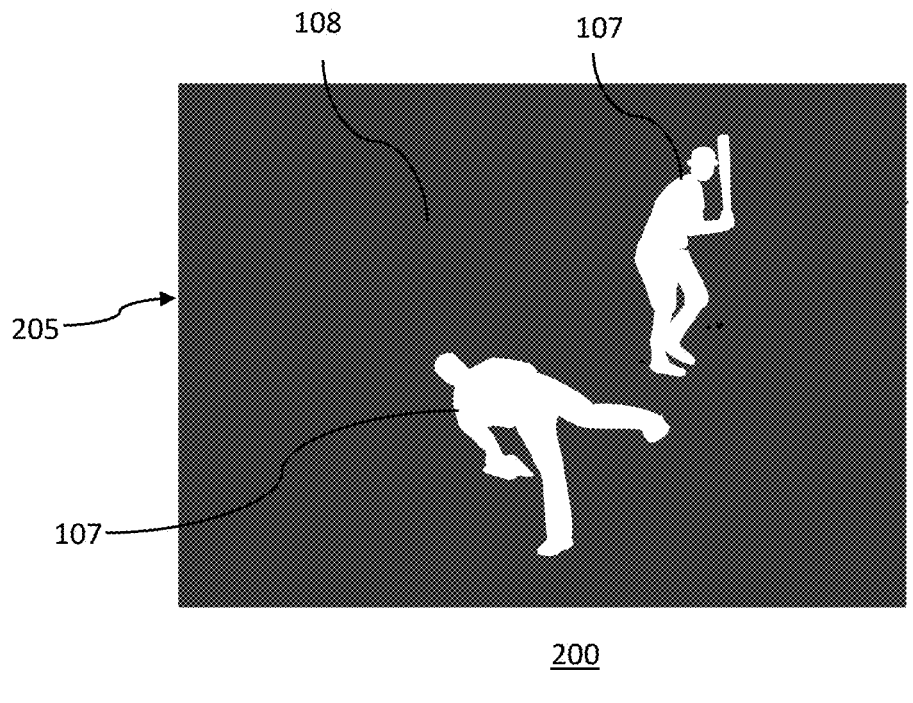
FIG. 2 shows a schematic representation of a binary segmentation mask.

FIG. 2 shows a schematic representation 200 of a binary segmentation mask 205.

Segmentation masks 205 have pixels that are typically referred to as alpha values. These alpha values are typically between 0 and 255, representing gray scale values from black (0) to white (255). These alpha values may be indicative of the amount of the underlying image that may be allowed to bleed through, or appear through, any overlay. An alpha value of 0 (black) typically means that the underlying image pixel is completely blocked, while an alpha value of 255 (white) typically means that the underlying image pixel is displayed rather than the overlay. A gradient alpha value, i.e., a value between 1 and 254, typically means that a percentage or fraction of the underlying image pixel is blended into the overlay. The amount of the underlying image that is blended in may, for instance, be proportional to the gradient alpha value.

As shown in FIG. 2, the segmentation mask 205 may be a binary mask in which regions containing background objects 108 may be assigned a black pixel indicating that pixels of any overlay will be shown in preference to any actual background object. Regions in which any foreground objects 107 occur may be assigned a white pixel indicating that in these regions the pixels of the foreground object will be shown in preference to any overlay placed in that region.

Figure 3:
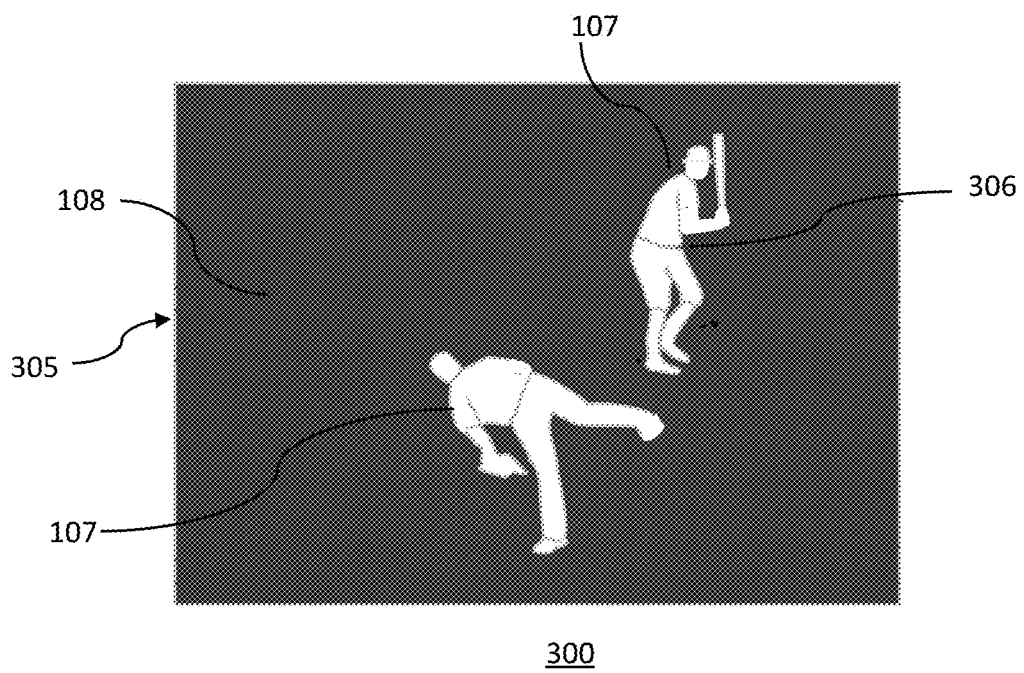
FIG. 3 shows a schematic representation of an augmented segmentation mask.

FIG. 3 shows a schematic representation 300 of an augmented segmentation mask 305. In such a mask, in addition to the black regions representing areas of background objects 108 and the white regions representing regions of foreground objects 107, there may be regions having a gradient alpha value 306. In digital computers, gray scale images are usually stored as 8-bit binary numbers having values from 0 to 255. By convention, 0 typically represents black and 255 represents white. The gradient alpha values may, for instance, be stored as a grey color having a value between 1 and 244. The grey value may represent a percentage or fraction of the background that may be allowed to bleed through, or be mixed with, the overlay image. For instance, a value of 122 may allow 50% of the background to be mixed with the overlay image. This mixing may, for instance, soften or stabilize the appearance of the overlay in a vicinity of a foreground object.

Figure 4:
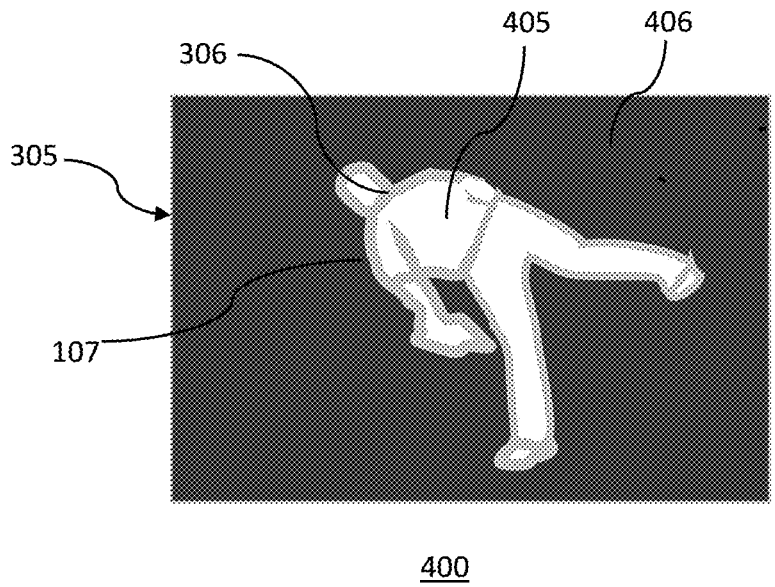
FIG. 4 shows a further schematic representation of an augmented segmentation mask.

FIG. 4 shows a further schematic representation 400 of an augmented segmentation mask 305.

In FIG. 4, the augmented separation mask has white pixels 405 to allow the foreground objects to be completely visible through the overlay, black pixels 406 to completely block background objects from showing through the overlay, and gradient alpha values 306 in regions where a portion of the underlying, or background image, is mixed in with the overlay.

Figure 5:
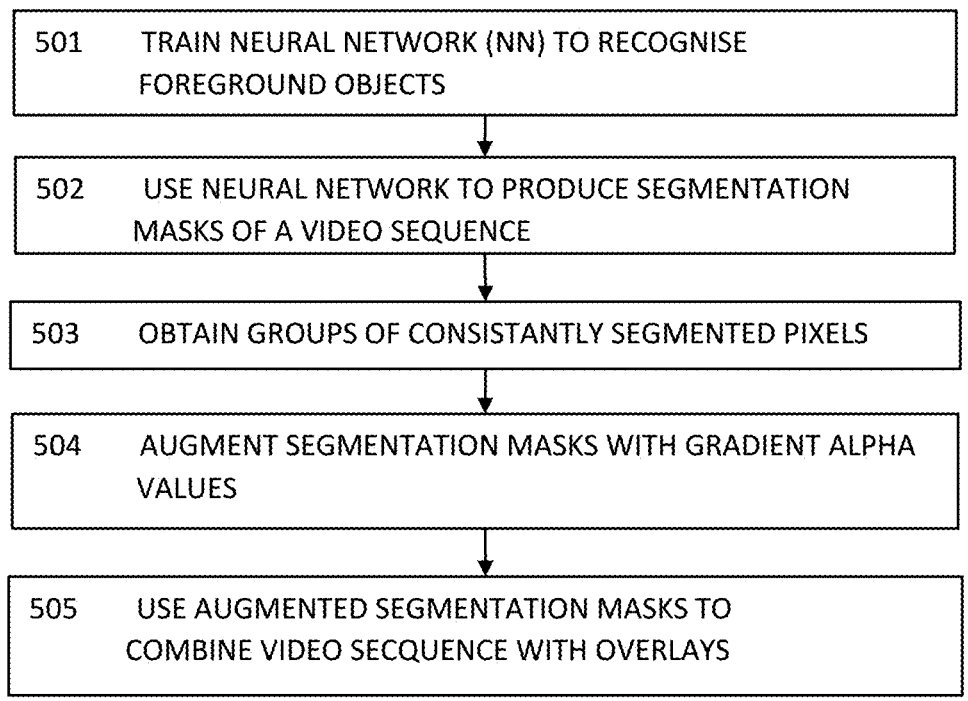
FIG. 5 is a flow chart showing representative steps of using an augmented segmentation mask to combine a video sequence with overlays.

FIG. 5 is a flow chart 500 showing representative steps of using an augmented segmentation mask to combine a video sequence with overlays.

In Step 501 "TRAIN NEURAL NETWORK (NN) TO RECOGNISE FOREGROUND OBJECTS" a neural network may be trained to recognize typical foreground objects. Typical foreground objects may depend on the nature of the source video onto which overlay images are to be placed. For instance, if the source video is of a game such as, but not limited to, baseball or soccer, the foreground objects may include baseball players, soccer players, umpires, referees, their uniforms, baseball bats, baseballs, and soccer balls or some combination thereof.

Neural networks that may be used for object recognition in images include, but are not limited to, Convolutional Neural Networks (CNNs) and Recurrent Neural Networks (RNNs).

Convolutional Neural Networks (CNNs) may be trained using supervised learning. This typically involves exposing the CNN to large batches of labeled images representative of the objects to be identified. To obtain high recognition accuracy, hundreds to thousands of labeled images may need to be run through the system thousands of times. Obtaining and labeling the images may be time consuming and expensive. The amount of computation involved in the training may require substantial use of high-powered computers and may also be time-consuming and expensive. To reduce the cost of training, the neural network may be lightly trained, i.e., trained on a limited data set for a limited number of epochs such that the neural network is capable of recognizing selected objects but with an accuracy that may only differentiate individual pixels in range of 50% to 95%, or even in a range of 80% to 90%, of the time.

In Step 502 "USE NEURAL NETWORK TO PRODUCE SEGMENTATION MASKS OF A VIDEO SEQUENCE" the lightly trained NN obtained in Step 501 may now be used to produce low-quality segmentation masks to enable placing overlays onto a video sequence. The video sequence may, for instance, be made up of a sequence of frames {1, 2, . . . N}. The low-quality segmentation masks may, for instance, be binary segmentation masks in which all regions may be designated as background regions and assigned a value of 0 (black) except for regions in which a foreground object is detected by the NN. The regions in which the foreground object is detected may be assigned a value of 255 (white) indicating that the foreground object is not to be obscured by the overlay, i.e., the foreground object pixels are to be displayed with their full chromaticity and luminance.

The segmentation of each frame may result in a binary mask that may show each pixel detected as a foreground object in white, and every other pixel as part of the background in black: {S1, S2, . . . . SN}. Each binary segmentation mask Si, may potentially suffer from multiple defects. For instance, some parts of the foreground object may not be fully detected, resulting in false negatives. At the same time, some parts of the background may be wrongly detected as being part of a foreground object, resulting in false positives. In addition to the false negatives and false positives, the true positives may not be consistently placed along the video sequence. As the sequence {S1, S2 . . . . SN} is played this inconsistency may be visible as a noticeable flickering of the resultant image. Such flickering may render the combined sequences unfit for use in a particular application such as, but not limited to, being broadcast to an audience.

However, by comparing each pair of adjacent segmentations, Si and Si+1, along the sequence, it may be possible to map, or compare, pixels segmented at frame i and at frame i+1, and then decide which pixels were under-segmented, and which pixels were over-segmented. The segmentation masks may then be improved to eliminate any flickering by assigning a gradient alpha to certain pixels, i.e., a high-quality, augmented segmentation mask may be created in which some of the mask pixels are grey, having a value between 1 and 254.

In Step 503 "OBTAIN GROUPS OF CONSISTANTLY SEGMENTED PIXELS", adjacent segmentation masks may be examined to obtain groups of pixels that are constantly labeled as being either foreground or background pixels.

This may, for instance, be accomplished by first clustering the segmented pixels on adjacent frames i and i+1 into groups using clustering methods such as K-mean clustering. As a result, on each segmented frame Si, the segmented pixels are grouped into several groups $\{G_1, G_2 \ldots G_m\}$. For each group in Si and each group in Si+1, a correlation may be found by, for example using template-matching. The best match for each group in Si may be found as the best correlating group in Si+1. Only the best matches, i.e., the ones in which the template matching results are higher than a predetermined threshold may be kept. This process may be repeated for each pair of adjacent frames in the sequence, i.e., each Si,Si+1 in {S1, S2, . . . . SN}.

The best matches over the sequence may then be located. For instance, the best group matching may be found such that the chain of matching is consistently "good", i.e., the template matching results are higher than some threshold, over some number of adjustment frames—for example over 3 frames. That is, for the 3-frames example, groups in segmentations i, i+1, i+2, may be found such that the correlation from the group (i) to group (i+1), and the correlation from group (i+1) to group (i+2) are all higher than the threshold.

In Step 504 "AUGMENT SEGMENTATION MASKS WITH GRADIENT ALPHA VALUES". The segmentation masks obtained in Step 502 may be binary masks and may contain minor inconsistencies, i.e., there may be pixels that are labeled differently in subsequent masks in a stream of masks. These inconsistencies may be minor and may be due to inadequate training of the neural network used to produce them. However, even minor inconsistencies in the binary segmentation masks may lead to slight flickering of the overlayed image, which may be annoying to views of the composite video. One way to avoid this may be to improve the training of the neural network. However, this may be very time-consuming and expensive. A more efficient way to produce high-quality segmentation masks that produce acceptable quality composite images may be to produce augmented masks in which some regions have gradient alpha values. These gradient alpha values may allow a portion of the background pixel to be blended with the overlay pixel. This blending of the pixels may reduce the flicker introduced by inconsistent labeling of the pixels. One way to implement the blending is to first identify groups of pixels that are consistently labeled, and then to examine a region surrounding the consistently labeled groups of pixels, and assign them suitable gradient alpha values.

In those groups, group (i), group (i+1), group (i+2), the neighboring pixels may be checked for similarity to the segmented pixels. The neighborhood checked may, for example, be a square kernel of size 21×21. Each unsegmented pixel in that kernel may be assigned a gradient alpha based on the "distance" of the R, G, B color of that pixel from the mean color of the clustered k-mean region. This step may significantly suppress false-negative errors.

At the same time, for each of the groups in which the template matching results have a low correlation and fall below some predetermined threshold, a gradient alpha value may be assigned to the pixels in that group based on their distance from the low-correlation threshold. This step may significantly suppress any false-positive errors.

In Step 505 "USE AUGMENTED SEGMENTATION MASKS TO COMBINE VIDEO SEQUENCE WITH OVERLAYS", the augmented segmentation masks obtained in the previous steps may now be used to combine overlays with video sequences to obtain combined video sequences.

Figure 6:
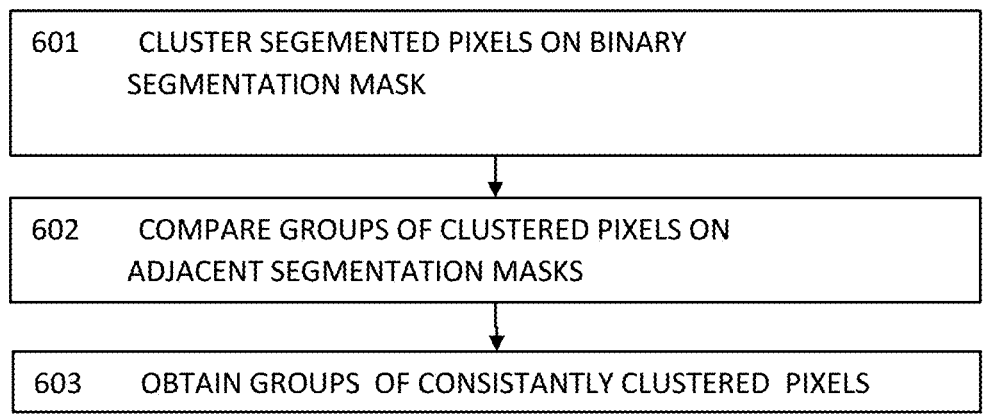
FIG. 6 is a flow chart showing representative steps of obtaining groups of consistently clustered pixels.

FIG. 6 is a flow chart 600 showing representative steps of obtaining groups of consistently clustered pixels.

In Step 601 "CLUSTER SEGMENTED PIXELS ON BINARY SEGMENTATION MASK" a sequence of segmentation masks may be examined. The segmentation masks may, for instance, be low-quality, binary segmentation masks obtained by, for instance, using a neural network that may be lightly trained to recognize anticipated foreground objects.

The segmented pixels on each of the segmentation masks may first be clustered into groups. Pixel clustering in an image may be performed by a variety of well-known algorithms such as, but not limited to, K-means clustering, hierarchical clustering, density-based clustering, or spectral clustering or some combination thereof.

K-means clustering is a clustering algorithm that initially partitions a set of data points into k clusters. Each pixel in the image may be treated as a data point with its own feature vector, usually consisting of its RGB values. The algorithm may first assign each pixel to its nearest cluster center. The algorithm may then recalculate the cluster centers based on the new assignments, and reassign each pixel to one of the new cluster centers. The process may then be repeated until the algorithm converges to a state in which no further reassignment is necessary.

In Step 602 "COMPARE GROUPS OF CLUSTERED PIXELS ON ADJACENT SEGMENTATION MASKS" each of the groups of clustered segmented pixels obtained in Step 601 may be compared with corresponding groups in one or more adjacent segmentation masks. The comparison may, for instance, be performed using techniques such as, but not limited to, correlation. The correlation may use template matching in which one of the groups of segmented pixels found on one of the segmentation masks may be used as template in a vicinity of corresponding groups of segmented pixels on adjacent or subsequent segmentation masks.

In Step 603 "OBTAIN GROUPS OF CONSISTENTLY CLUSTERED PIXELS" groups in which corresponding groups of segmented pixels have a consistent appearance over a number of consecutive segmentation masks may be identified. They may, for instance, be groups in which the correlation is consistent over two to three consecutive segmentation masks, thereby forming a chain of consistently segmented groups.

In a preferred embodiment, the selected groups of segmented pixels may be those in which the correlations are higher than a predetermined high threshold in at least three successive segmented masks.

Figure 7:
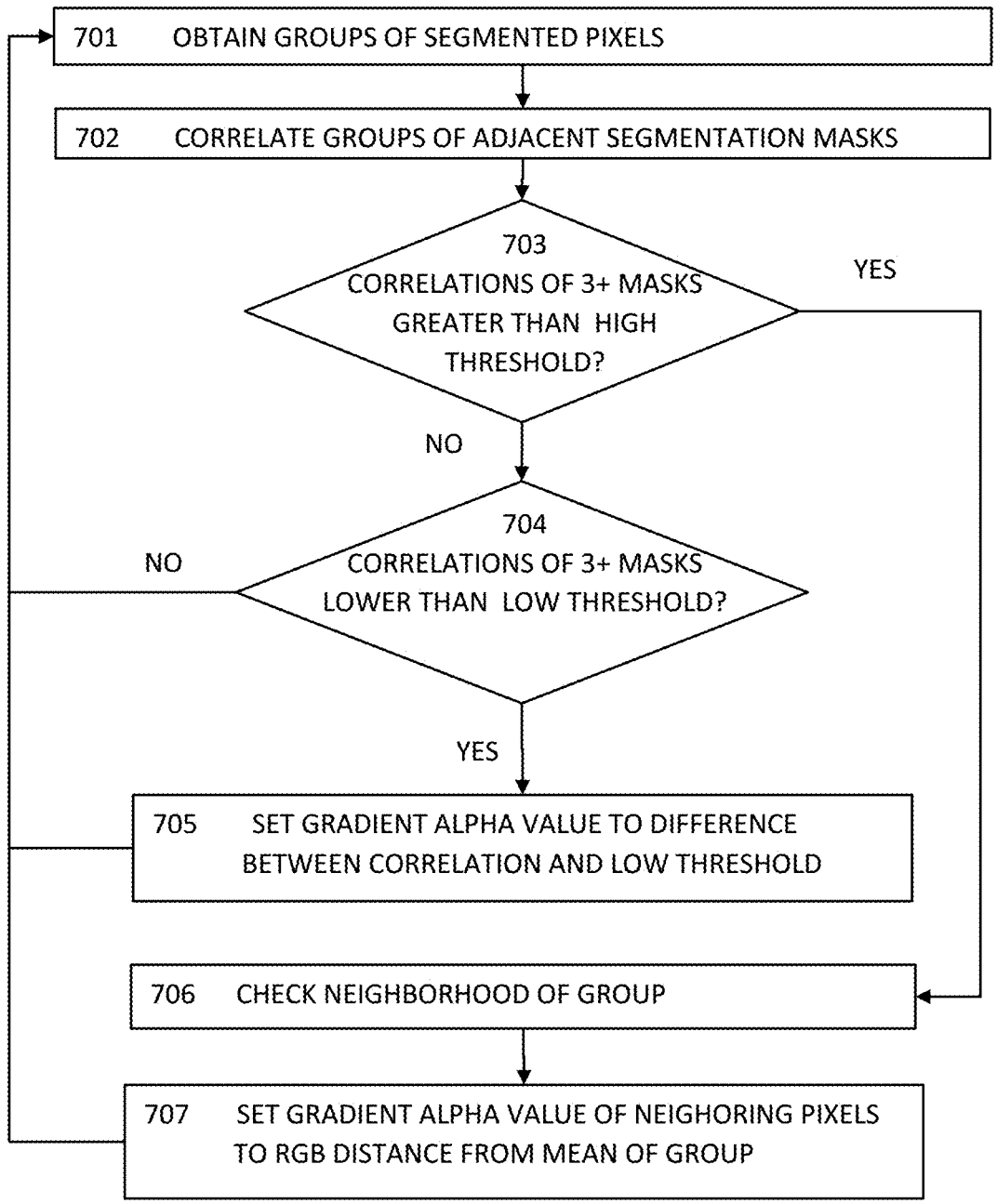
FIG. 7 is a flow chart showing representative steps of obtaining augmented segmentation masks.

FIG. 7 is a flow chart showing representative steps of obtaining augmented segmentation masks.

In Step 701 "OBTAIN GROUPS OF SEGMENTED PIXELS" groups of segmented pixels may be obtained in each of a sequence of segmented masks.

The segmentation masks may, for instance, be binary segmentation masks obtained by, for instance, using a lightly trained neural network that may be lightly trained to recognize anticipated foreground objects.

The groups of segmented pixels on each of the segmentation masks may, for instance, be obtained by clustering. Pixel clustering may be performed by a variety of well-known algorithms such as, but not limited to, K-means clustering, hierarchical clustering, density-based clustering, or spectral clustering or some combination thereof.

In Step 702 "CORRELATE GROUPS OF ADJACENT SEGMENTATION MASKS" the corresponding groups of segmented pixels found in adjacent segmentation masks may be compared. This comparison may, for instance, be performed by correlation in which one of the groups of segmented pixels may be used as a correlation template.

In Step 703 "CORRELATIONS OF 3+ MASKS GREATER THAN HIGH THRESHOLD?" the correlations of corresponding groups of segmented pixels may be compared over a number of adjacent segmentation masks. If the correlations are found to be greater than a predetermined high threshold in at least three or more segmentation masks, the process may then proceed to Step 706 "CHECK NEIGHBORHOOD OF GROUP".

In Step 706 "CHECK NEIGHBORHOOD OF GROUP" pixels in a neighborhood of the group may be checked. The neighborhood may, for instance, be a region of 21 by 21 pixels.

In Step 707 "SET GRADIENT ALPHA VALUE OF NEIGHBORING PIXELS TO RGB DISTANCE FROM MEAN OF GROUP" corresponding pixels of the segmentation mask in the neighborhood of the group of consistently segmented pixels may be assigned a gradient alpha value thereby creating an augmented segmentation mask. The gradient alpha value may be a grey scale value in a range of 1 to 254 and may be proportional to, for instance, the RGB distance of the pixel from the mean color of the group of consistently segmented pixels. The distance D may, for instance, be defined as:

$$D = \text{Sqrt}((R^2 - R_m^2) + ((G^2 - G_m^2) + ((B^2 - B_m^2))) \quad (1)$$

where R, G and B are the red, green, and blue color components of the pixel and $R_m$, $G_m$ and $B_m$ are the mean color components of the group of constantly segmented pixels.

If in Step 703, the correlations are not found to be greater than a predetermined high threshold in at least three or more segmentation masks, the process may then proceed to Step 704.

In Step 704 "CORRELATIONS OF 3+ MASKS LOWER THAN LOW THRESHOLD?" the correlations of corresponding groups of segmented pixels may be compared over a number of adjacent segmentation masks. If the correlations are found to be less than a predetermined low threshold in at least three or more segmentation masks, the process may then proceed to Step 705.

In Step 705 "SET GRADIENT ALPHA VALUE TO DIFFERENCE BETWEEN CORRELATION AND LOW THRESHOLD" the corresponding pixels of the segmentation mask may be assigned a gradient alpha value thereby creating an augmented segmentation mask. The gradient alpha value may, for instance, be a equal to, or proportional to, a difference between the correlation value and the predetermined low threshold.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A method of producing high quality image segmentation masks, comprising:
    providing a lightly trained neural network trained to recognize foreground objects in a first sequence of video frames;
    segmenting a second sequence of video frames using said lightly trained neural network, thereby, producing a sequence of low-quality segmentation masks;
    obtaining one or more groups of consistently segmented pixels from said sequence of low-quality segmentation masks by:
        clustering segmented pixels on each of said segmentation masks into groups;
        comparing groups of clustered pixels on adjacent segmentation masks; and,
        selecting groups of clustered pixels that form a chain over a number of segmentation masks as said consistently segmented groups of pixels; and,
    augmenting said low-quality segmentation masks by assigning a gradient alpha value to pixels neighboring said consistently segmented groups of pixels, thereby producing said high quality image segmentation masks.

2. The method of claim 1, wherein, comparing clustered pixels on adjacent segmentation masks comprises:
    correlating templates of each group of segmented pixels in a first segmentation mask with groups of segmented pixels in a second, adjacent segmentation mask; and,
    selecting groups of segmented pixels in which said correlations are higher than a predetermined high threshold in at least three successive segmentation masks as a first set of consistently segmented groups of pixels.

3. The method of claim 2, further comprising, checking pixels in a neighborhood of said first set of consistently segmented groups of pixels; and, for unsegmented pixels in said neighborhood, assigning a gradient alpha value to said augmented segmentation masks.

4. The method of claim 3, wherein, gradient alpha values are proportional to an RGB distance of said pixels from a mean RGB value of said first set of consistently segmented pixels.

5. The method of claim 2, further comprising:
    selecting groups of segmented pixels in which said correlations are lower than a predetermined low threshold in at least three successive segmented masks as a second set of consistently segmented groups of pixels; and,
    for each pixel in said second set of consistently segmented groups of pixels, setting a gradient alpha value proportional to a distance of said group correlation from said low threshold in said augmented segmentation mask.

6. A system for producing high quality image segmentation masks, comprising:
    a neural network lightly trained to recognize foreground objects in a first sequence of video frames;
    a sequence of low-quality segmentation masks produced by using said lightly trained neural network to sequence a second sequence of video frames;
    one or more groups of consistently segmented pixels obtained from said sequence of low-quality segmentation masks by:
        clustering segmented pixels on each of said segmentation masks into groups;
        comparing groups of clustered pixels on adjacent segmentation masks; and,
        selecting groups of clustered pixels that form a chain over a number of segmentation masks as said consistently segmented groups of pixels; and,
    a set of augmented segmentation masks obtained by assigning a gradient alpha value to pixels neighboring said consistently segmented groups of pixels, said set of augmented segmentation masks being said desired set of high-quality image segmentation masks.

7. The system of claim 6, wherein, comparing clustered pixels on adjacent segmentation masks comprises:
    correlating templates of each group of segmented pixels in a first segmentation mask with groups of segmented pixels in a second, adjacent segmentation mask; and,
    selecting groups of segmented pixels in which said correlations are higher than a predetermined high threshold in at least three successive segmentation masks as a first set of consistently segmented groups of pixels.

8. The system of claim 7, further comprising, checking pixels in a neighborhood of said first set of consistently segmented groups of pixels; and, for unsegmented pixels in said neighborhood, assigning a gradient alpha value to said augmented segmentation masks.

9. The system of claim 8, wherein, said gradient alpha values are proportional to an RGB distance of said pixels from a mean RGB value of said first set of consistently segmented pixels.

10. The system of claim 6, further comprising: selecting groups of segmented pixels in which said correlations are lower than a predetermined low threshold in at least three successive segmentation masks as a second set of consistently segmented groups of pixels; and, for each pixel in said second set of consistently segmented groups of pixels, setting a gradient alpha value proportional to a distance of said group correlation from said low threshold in said augmented segmentation mask.

\* \* \* \* \*